(12) United States Patent  (10) Patent No.: US 9,873,320 B2
Young  (45) Date of Patent: Jan. 23, 2018

(54) FUEL TANK PRESSURE REGULATOR

(71) Applicant: Stant USA Corp., Connersville, IN (US)

(72) Inventor: Kevin L Young, Connersville, IN (US)

(73) Assignee: Stant USA Corp., Connersville, IN (US)

( * ) Notice: Subject to any disclaimer, the term of this patent is extended or adjusted under 35 U.S.C. 154(b) by 0 days.

(21) Appl. No.: 15/078,203

(22) Filed: Mar. 23, 2016

(65) Prior Publication Data

US 2016/0298778 A1    Oct. 13, 2016

Related U.S. Application Data

(60) Provisional application No. 62/145,068, filed on Apr. 9, 2015.

(51) Int. Cl.
    *B60K 15/00*      (2006.01)
    *B60K 15/035*     (2006.01)
    *F02M 25/08*      (2006.01)

(52) U.S. Cl.
    CPC ... B60K 15/03504 (2013.01); F02M 25/0836 (2013.01); *B60K 2015/03576* (2013.01)

(58) Field of Classification Search
    CPC .......... F02M 25/0836; B60K 15/03504; B60K 2015/03576
    See application file for complete search history.

(56) References Cited

U.S. PATENT DOCUMENTS

| 6,003,499 | A | 12/1999 | Devall et al. |
| 6,386,222 | B1 | 5/2002 | Harris |
| 6,481,592 | B2 | 11/2002 | Harris |
| 6,779,544 | B2 | 8/2004 | Devall |
| 7,270,117 | B1 | 9/2007 | Devall |
| 7,325,577 | B2 | 2/2008 | Devall |
| 7,556,067 | B2 | 7/2009 | McClung |
| 7,568,494 | B2 | 8/2009 | Devall |
| 7,823,610 | B2 * | 11/2010 | King ............... B60K 15/03504 137/202 |
| 8,584,704 | B2 | 11/2013 | Pifer et al. |
| 8,833,573 | B2 | 9/2014 | Tomaszewski et al. |
| 8,844,561 | B2 * | 9/2014 | Keller ............... F02M 25/0836 123/516 |
| 8,944,101 | B2 * | 2/2015 | Pifer ............... B60K 15/03519 123/516 |
| 9,371,803 | B2 * | 6/2016 | Pifer ................... F16K 31/0624 |
| 2007/0101974 | A1 * | 5/2007 | Achor .................... F02M 37/20 123/516 |
| 2007/0261752 | A1 | 11/2007 | McClung et al. |
| 2010/0269921 | A1 * | 10/2010 | Pifer ............... B60K 15/03519 137/487.5 |
| 2011/0240145 | A1 * | 10/2011 | Pifer .................. F02M 25/0836 137/487.5 |
| 2012/0073548 | A1 * | 3/2012 | Lee .................. B60K 15/03519 123/520 |
| 2015/0144819 | A1 * | 5/2015 | Pifer ....................... F16K 24/04 251/129.15 |
| 2016/0311315 | A1 * | 10/2016 | Young ............. B60K 15/03519 |

* cited by examiner

*Primary Examiner* — Carlos A Rivera
*Assistant Examiner* — Sherman Manley
(74) *Attorney, Agent, or Firm* — Barnes & Thornburg LLP

(57) ABSTRACT

A fuel tank vent valve includes a venting apparatus for regulating discharge of fuel vapor from a fuel tank and admission of outside air into a fuel tank. The vent valve is used to regulate pressure in a fuel tank.

11 Claims, 9 Drawing Sheets

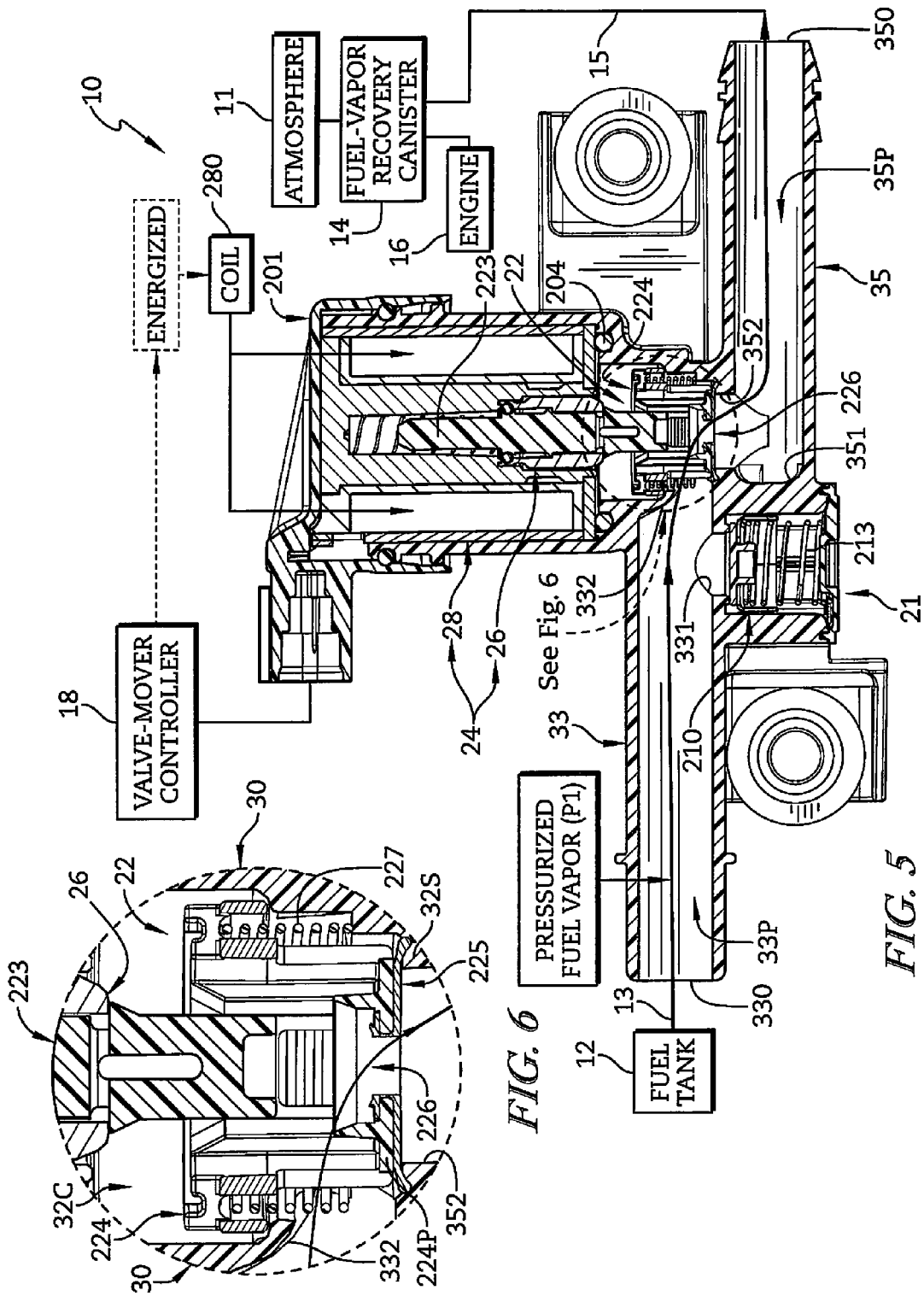

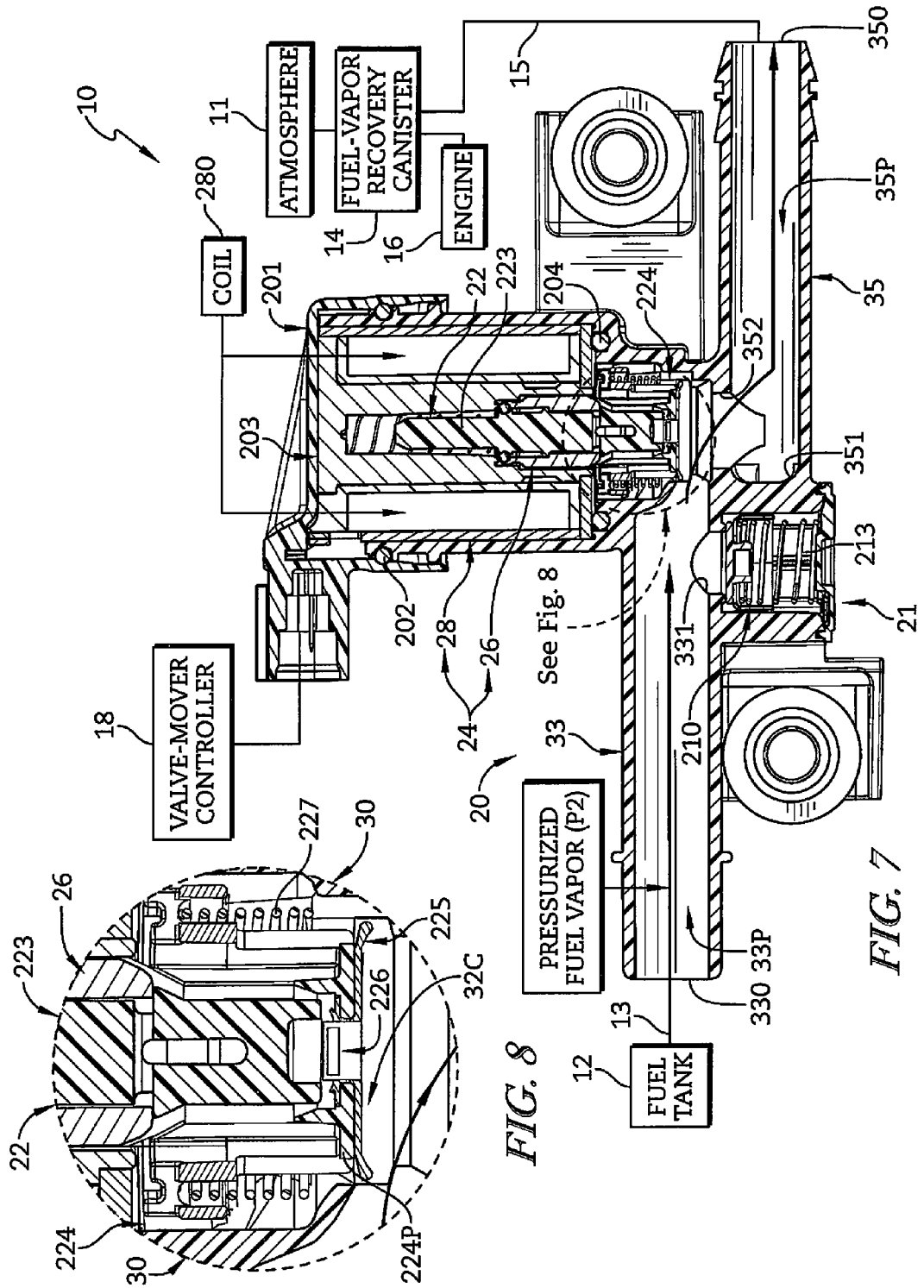

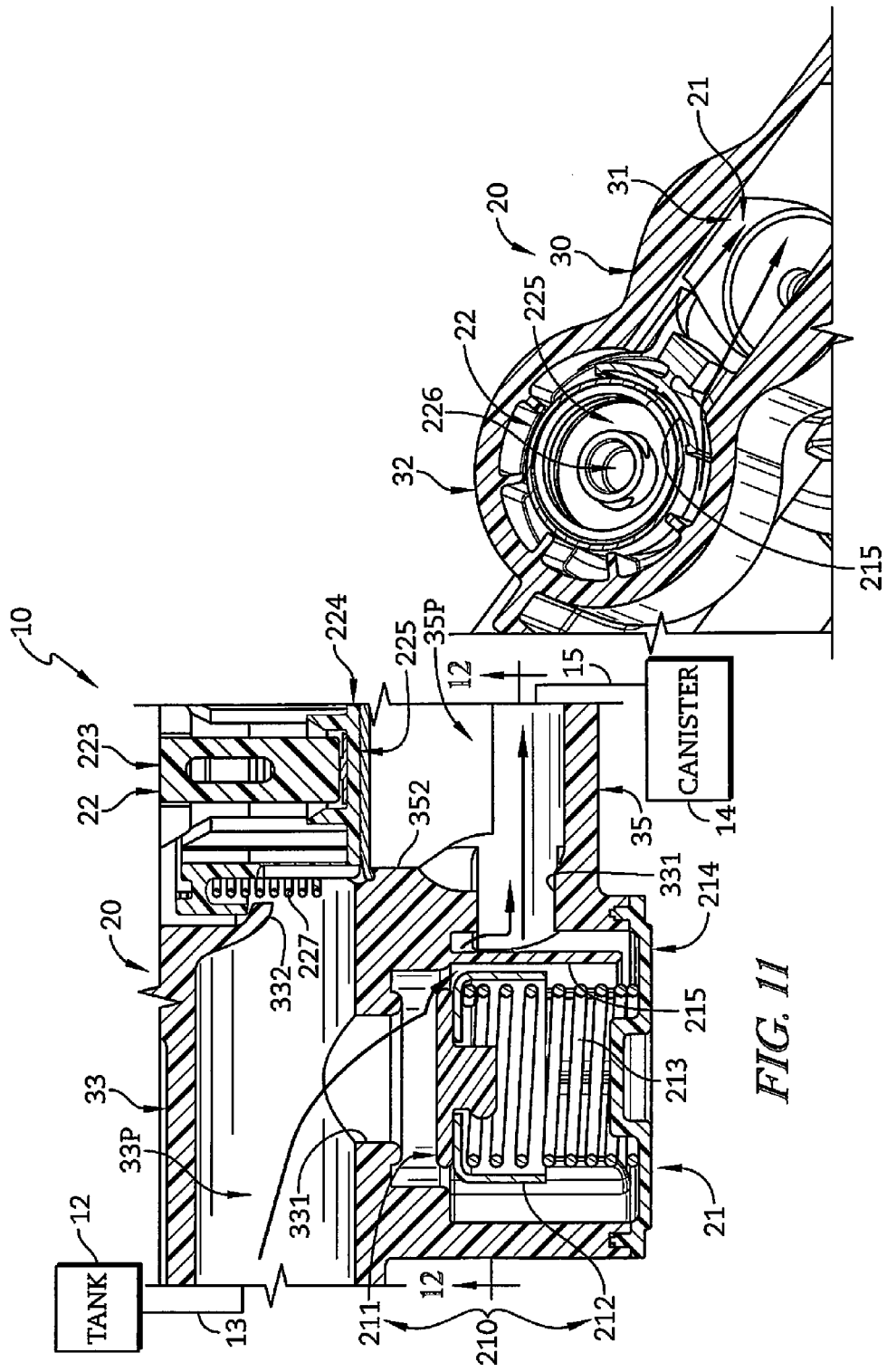

FUEL TANK PRESSURE REGULATOR

PRIORITY CLAIM

This application claims priority under 35 U.S.C. §119(e) to U.S. Provisional Application No. 62/145,068, filed Apr. 9, 2015, which is expressly incorporated by reference herein.

BACKGROUND

The present disclosure relates to fuel tank vent valves, and particularly to venting apparatus for regulating discharge of fuel vapor from a fuel tank and admission of outside air into the fuel tank. More particularly, the present disclosure relates to a fuel tank pressure regulator including a solenoid-activated fuel tank vent valve.

Vehicle fuel systems include valves associated with a fuel tank and configured to vent pressurized or displaced fuel vapor from the vapor space in the fuel tank to a vapor recovery canister located outside of the fuel tank. The canister is designed to capture and store hydrocarbons entrained in fuel vapors that are displaced and generated in the fuel tank during a typical vehicle refueling operation or that are otherwise vented from the fuel tank.

The vapor recovery canister is also coupled to a vehicle engine and to a purge vacuum source. Typically, vacuum is applied to the vapor recovery canister by the purge vacuum source whenever the vehicle engine is running in an effort to suck hydrocarbons captured and stored in the canister into the engine for combustion.

In addition, valves associated with fuel tanks are sometimes provided with vacuum-relief valves which open in response to onset of vacuum conditions in a vehicle fuel tank. When the temperature of the vehicle fuel tank drops, the fuel vapor pressure in the vehicle fuel tank can drop to a level lower than atmospheric pressure. A vacuum-relief valve is typically configured to allow air to enter the fuel tank, thereby returning the pressure in the fuel tank to an acceptable level.

SUMMARY

A tank venting system in accordance with the present disclosure includes vapor flow controllers for regulating flow of fuel vapor between a fuel tank and a fuel vapor recovery system in a vehicle. The flow of fuel vapor is controlled to maintain the pressure of fuel vapor in the fuel tank at a certain pressure level or within a certain pressure range.

In illustrative embodiments, a vent apparatus includes a single-stage valve mounted for movement in a body to regulate flow of fuel vapor from a fuel tank to a fuel vapor recovery canister along a first vapor flow path in the body and a multi-stage valve mounted for movement in the body to regulate flow of fuel vapor between the fuel tank and the fuel vapor recovery canister along a separate second vapor flow path in the body. Movement of the multi-stage valve in the body is independent of movement of the single-stage valve in the body.

In illustrative embodiments, the multi-stage valve can be moved from a closed position in the body to assume one of three opened positions. A first stage of tank venting is established upon movement of the multi-stage valve to a FIRST opened position while a second stage of tank venting is established upon movement of the multi-stage valve to a SECOND opened position. Admitting atmospheric air into the fuel tank to dissipate a vacuum that has developed in the fuel tank happens upon movement of the multi-stage valve to a THIRD opened position. The single-stage valve can be moved from a closed position to an opened position to vent pressurized fuel vapor from the fuel tank to the fuel vapor recovery canister.

In illustrative embodiments, the vent apparatus includes an electronic valve mover that is coupled to the multi-stage valve and configured to move the multi-stage valve to the FIRST opened position by remote control. The electronic valve mover includes a stationary solenoid anchored to the body and a moveable armature mounted on a movable portion of the multi-stage valve to move therewith. When the solenoid is energized, the movable portion of the multi-stage valve moves relative to the body and to a relatively stationary portion of the multi-stage valve to establish the FIRST opened position of the multi-stage valve to allow pressurized fuel vapor to flow from the fuel tank along the multi-stage vapor flow path to the fuel vapor recovery canister.

Additional features of the present disclosure will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which:

FIG. 5 is a view similar to FIG. 3 showing the single-stage valve in a closed position and showing the multi-stage valve in a solenoid-activated FIRST opened position to vent pressurized fuel vapor from the tank passageway into the canister passageway in response to activation of the valve-mover controller included in the tank venting system to energize a coil included in the solenoid to produce a magnetic field in the armature that is coupled to the plunger in the multi-stage valve to draw the armature further into a vertical central channel formed in the solenoid to move the plunger of the multi-stage valve upwardly from a closed position closing a small-diameter vent aperture formed in the diaphragm seal mounted on the underside of the plunger-receiver cage included in the multi-stage valve to an opened position opening the underlying small-diameter vent aperture to allow pressurized fuel vapor to flow from the tank passageway through the small-diameter vent aperture into the canister passageway toward the downstream fuel-vapor recovery canister while the diaphragm seal carried on the plunger-receiver cage remains mated with the underlying upwardly facing annular valve seat formed in the base;

FIG. 6 is an enlarged view taken from the circled region of FIG. 5;

FIG. 7 is a view similar to FIGS. 3 and 5 showing the single-stage valve in a closed position and showing the multi-stage valve in a pressure-activated SECOND opened position to vent pressurized fuel vapor from the tank passageway into the canister passageway after the pressure of that pressurized fuel vapor extant in the tank passageway has lowered from a first pressure (P1) suggested in FIG. 5 to a lower second pressure (P2) suggested in FIG. 7 to allow the coiled cage-biasing spring associated with the plunger-receiver cage to act against the base and urge the plunger-receiver cage upwardly away from an underlying annular valve seat formed in the base of the vent apparatus to open the large-diameter vent aperture bounded by the upwardly facing annular valve seat formed in the base to allow pressurized fuel vapor to flow from the tank passageway through the large-diameter vent aperture into the canister passageway toward the downstream fuel-vapor recovery canister;

FIG. 8 is an enlarged view taken from the circled region of FIG. 7;

FIG. 11 is an enlarged view taken from the circled region of FIG. 10;

FIG. 12 is a partial perspective view taken generally along lines 12-12 of FIG. 11.

DETAILED DESCRIPTION

Figure 1:
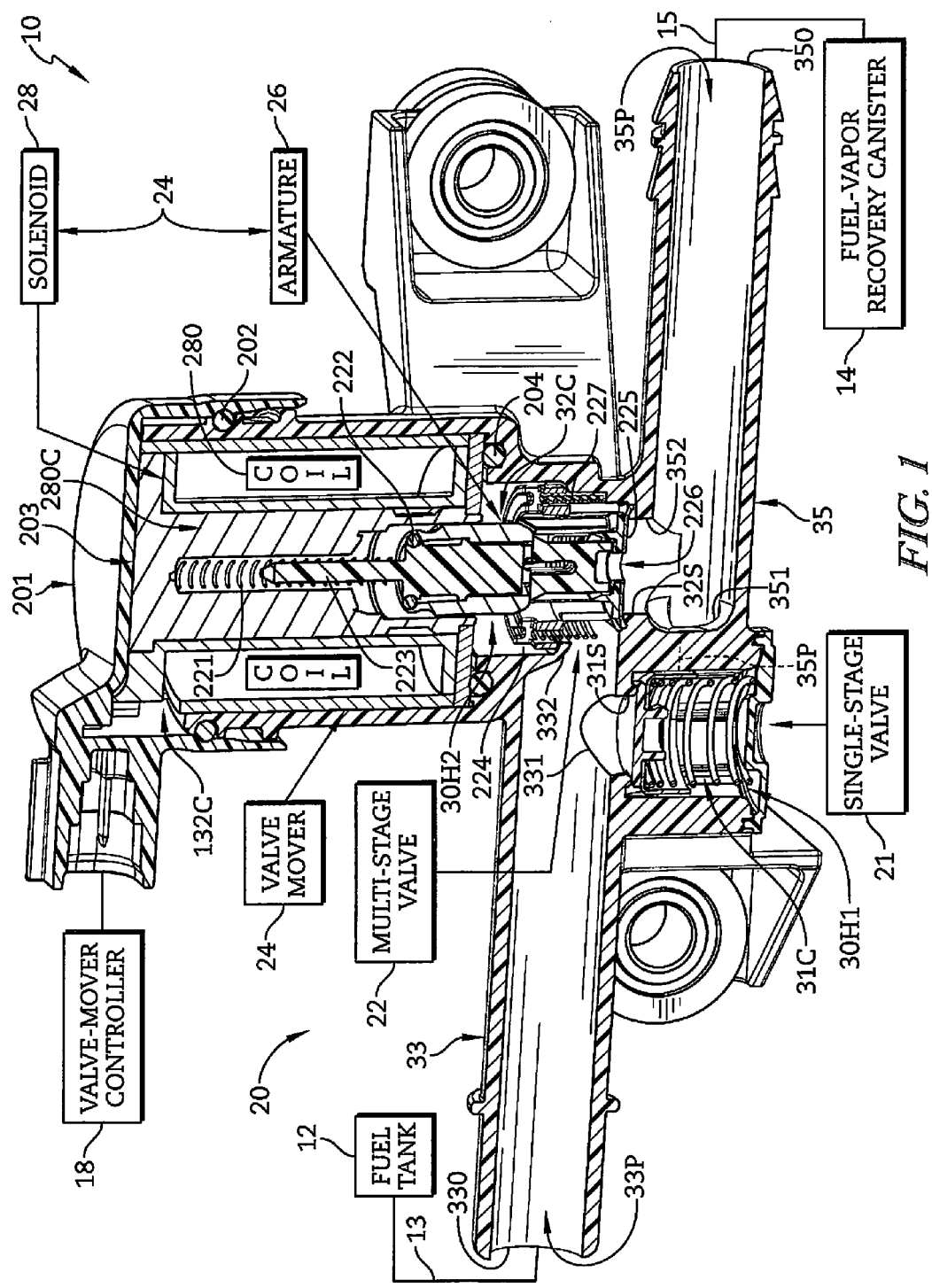
FIG. 1 is a sectional perspective view of a tank venting system including a vent apparatus in accordance with the present disclosure, a fuel tank coupled to a tank passageway formed in a tank pipe included in the vent apparatus, a fuel-vapor recovery canister coupled to a canister passageway formed in a canister pipe included in the vent apparatus, and showing that the vent apparatus comprises (1) a multi-stage valve configured to regulate the flow of pressurized fuel vapor from the tank passageway along a multi-stage vapor flow path into the canister passageway to relieve unwanted tank pressure conditions as suggested in FIGS. 5 and 7 and also to regulate the flow of outside air from the canister passageway along the multi-stage vapor flow path into the tank passageway to relieve unwanted tank vacuum conditions automatically as suggested in FIG. 9, (2) an electronic valve mover including a movable armature coupled to the multi-stage valve to move therewith and a solenoid comprising a stationary coil formed to include a central vertical channel receiving portions of the movable armature and multi-stage valve therein, which coil can be energized by remote control using a valve-mover controller also included in the tank venting system just before a fuel tank refueling activity begins to move the armature relative to the coil and thus cause movement of the multi-stage valve relative to the coil to an opened tank-venting position shown in FIG. 5, and (3) a single-stage valve arranged to regulate flow of pressurized fuel vapor from the tank passageway into the canister passageway as suggested in FIGS. 10 and 11 along a single-stage vapor flow path that is separate from the multi-stage vapor flow path regulated by the multi-stage valve.

A tank venting system 10 is provided to control flow of air and fuel vapor between a fuel tank 12 and an emission control system including a fuel vapor recovery canister 14 as suggested in FIG. 1. System 10 is used onboard a vehicle (not shown) including an engine 16 and a purge vacuum source (not shown) coupled to engine 16 and canister 14 as suggested in FIG. 3.

Figure 9:
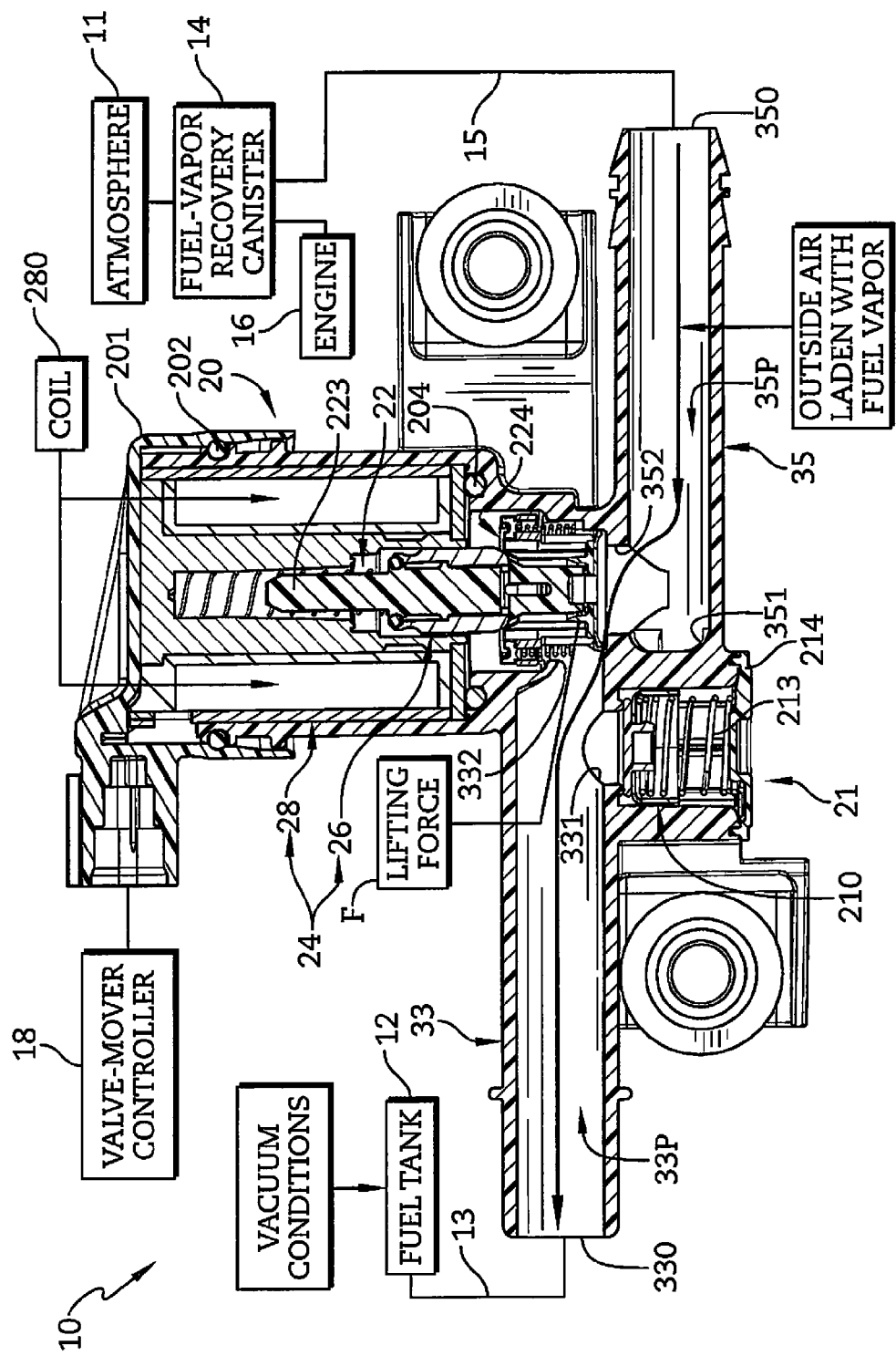
FIG. 9 is a view similar to FIGS. 3, 5, and 7 showing the single-stage valve in a closed position and showing the multi-stage valve in a vacuum-activated THIRD opened position after vacuum (e.g., negative pressure) conditions have developed in the fuel tank to apply a sufficient lifting force to a topside of a diaphragm-mount plate included in a lower portion of the plunger-receiver cage of the multi-stage valve to raise the plunger-receiver cage upwardly (with assistance from the coiled cage-biasing spring) to cause the underlying diaphragm seal to move upwardly away from the underlying annular valve seat formed in the base to open the large-diameter vent aperture defined by the annular valve seat formed in the base so that outside air at atmospheric pressure passing through the fuel-vapor recovery canister can flow from the canister passageway through the opened large-diameter vent aperture into the tank passageway to relieve unwanted vacuum conditions in the fuel tank.

Tank venting system 10 also includes a vent apparatus 20 coupled to fuel tank 12 via a tank conduit 13 and to fuel vapor recovery canister 14 via a canister conduit 15 as suggested in FIG. 1. Vent apparatus 20 includes a single-stage valve 21 and a separate multi-stage valve 22. Single-stage valve 21 is used to regulate flow of pressurized fuel vapor from fuel tank 12 to fuel vapor recovery canister 14 as suggested, for example, in FIG. 10. Multi-stage valve 22 is used to regulate flow of air and fuel vapor between fuel tank 12 and fuel vapor recovery canister 14 as suggested, for example, in FIGS. 5, 7, and 9.

Vent apparatus 20 also includes an electronic valve mover 24 associated with multi-stage valve 22 and configured to move portions of multi-stage valve by remote control to vent pressurized fuel vapor from fuel tank 12 to fuel vapor recovery canister 14 on demand Electronic valve mover 24 includes an armature 26 that is mounted on multi-stage valve 22 to move therewith and a stationary solenoid 28 comprising a coil 280 that can be energized using electricity to produce a magnetic field in armature 26 that causes armature 26 to move relative to solenoid 28. Such movement of armature 26 causes multi-stage valve 22 to move relative to the stationary solenoid 28 from a closed position shown in FIG. 3 to a FIRST opened position shown in FIG. 5 to allow pressurized fuel vapor to flow from fuel tank 12 to fuel vapor recovery canister 14. A valve-mover controller 18 is also included in tank venting system 10 and is operable to activate valve mover 24 to move multi-stage valve 22 to the FIRST opened position to vent pressurized fuel vapor from fuel tank 12 to fuel vapor recovery canister 14 as suggested in FIG. 5.

Figure 13:
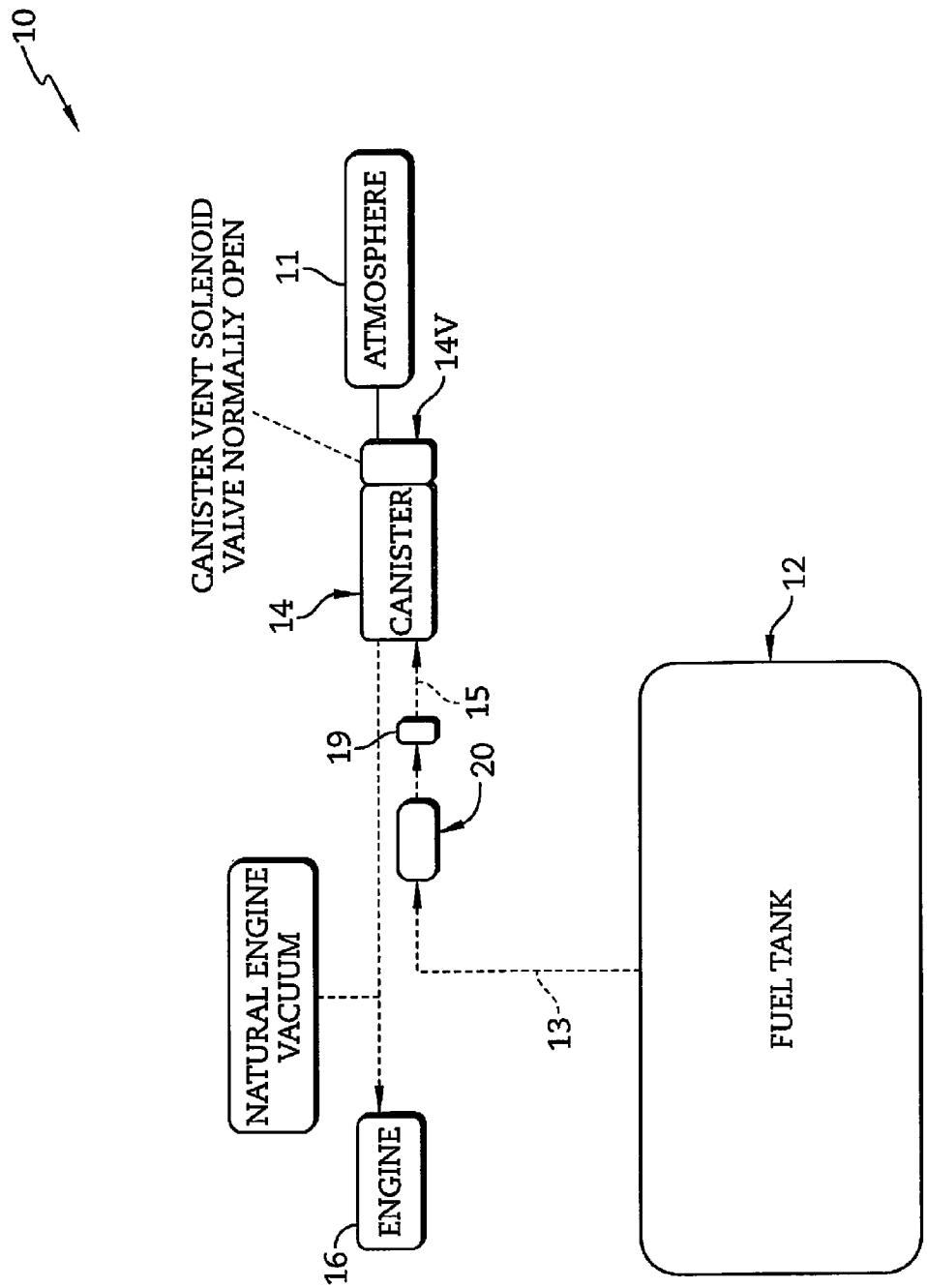
FIG. 13 is a diagrammatic view of an illustrative tank venting system in accordance with the present disclosure.

Fuel vapor recovery canister 14 is used to capture and store hydrocarbons entrained in fuel vapor discharged from fuel tank 12 by vent apparatus 20. Canister 14 may be a carbon canister or other suitable fuel vapor treatment device. Canister 14 is exposed to outside atmospheric air 11 as suggested in FIG. 3. A canister vent solenoid valve 14V is coupled to fuel vapor recovery canister 14 to regulate fluid communication between canister 14 and the atmosphere 11 in illustrative embodiments of the present disclosure as suggested in FIG. 13. It is within the scope of the present disclosure to place a pressure sensor 15 in canister conduit 15 as suggested in FIG. 13.

A base 30 included in vent apparatus 20 is formed to include passageways and chambers that function to conduct fluid between the tank conduit 13 that is coupled to fuel tank 12 and the canister conduct 15 that is coupled to fuel vapor recovery canister 14. Base 30 is formed to include one holding compartment 30H1 for holding the single-stage valve 21 and another holding compartment 30H2 for holding the multi-stage valve 22 and the solenoid 28 as suggested in FIG. 1. Base 30 is formed to include vent apertures 331, 332, 351, and 352 linking those compartments 30H1, 30H2 with the tank conduit 13 associated with fuel tank 12 and the canister conduit 15 associated with canister 14 as suggested in FIGS. 5, 7, 9, and 10. Base 30 is a monolithic component made of a plastic material in illustrative embodiments of the present disclosure.

Base 30 also includes a single-stage valve housing 31 for single-stage valve 21 and a multi-stage valve housing 32 for multi-stage valve 22 as suggested in FIG. 1. Single-stage valve housing 31 is formed to include first holding compartment 30H1 as suggested in FIG. 1. Multi-stage valve housing 32 is formed to include second holding compartment 30H2 as suggested in FIG. 1.

Base 30 includes a tank pipe 33 coupled to tank conduit 13 and a canister pipe 35 coupled to canister conduit 15 as suggested in FIG. 1. Tank pipe 33 is formed to include a tank passageway 33P that is in fluid communication with tank conduit 13 and each of holding compartments 30H1, 30H2 as suggested in FIG. 1. Canister pipe 35 is formed to include a canister passageway 35P that is in fluid communication with each of holding compartments 30H1, 30H2 and canister conduit 15 as suggested in FIGS. 1 and 10.

Multi-stage valve 22 regulates fluid flow in base 30 between the tank and canister conduits 13, 15 through the second holding compartment 30H2 formed in multi-stage valve housing 32 as suggested in FIGS. 3, 5, 7, 9, and 10. Multi-stage valve 22 can be moved relative to the base 30 from a closed position shown in FIG. 3 to either: (1) a solenoid-activated FIRST opened position shown in FIG. 5 to vent pressurized fuel vapor from fuel tank 12 through a fluid-flow chamber 32C defined by holding compartment 30H2 along a multi-stage vapor flow path to fuel vapor recovery canister 14 to pre-vent pressurized fuel vapor in the fuel tank 12 before initiation of a fuel tank refueling activity, (2) a pressure-activated SECOND opened position shown in FIG. 7 to vent pressurized fuel vapor from fuel tank 12 through fluid-flow chamber 32C along the multi-stage vapor flow path to fuel vapor recovery canister 14 when pressure of fuel vapor in fuel tank exceeds a predetermined pressure level, or (3) a vacuum-activated THIRD opened position shown in FIG. 9 to admit outside air 11 passing through fuel vapor recovery canister 14 through fluid-flow chamber 32C along the multi-stage vapor flow path into fuel tank 12 to relieve vacuum conditions in fuel tank 12.

Figures 3, 4:
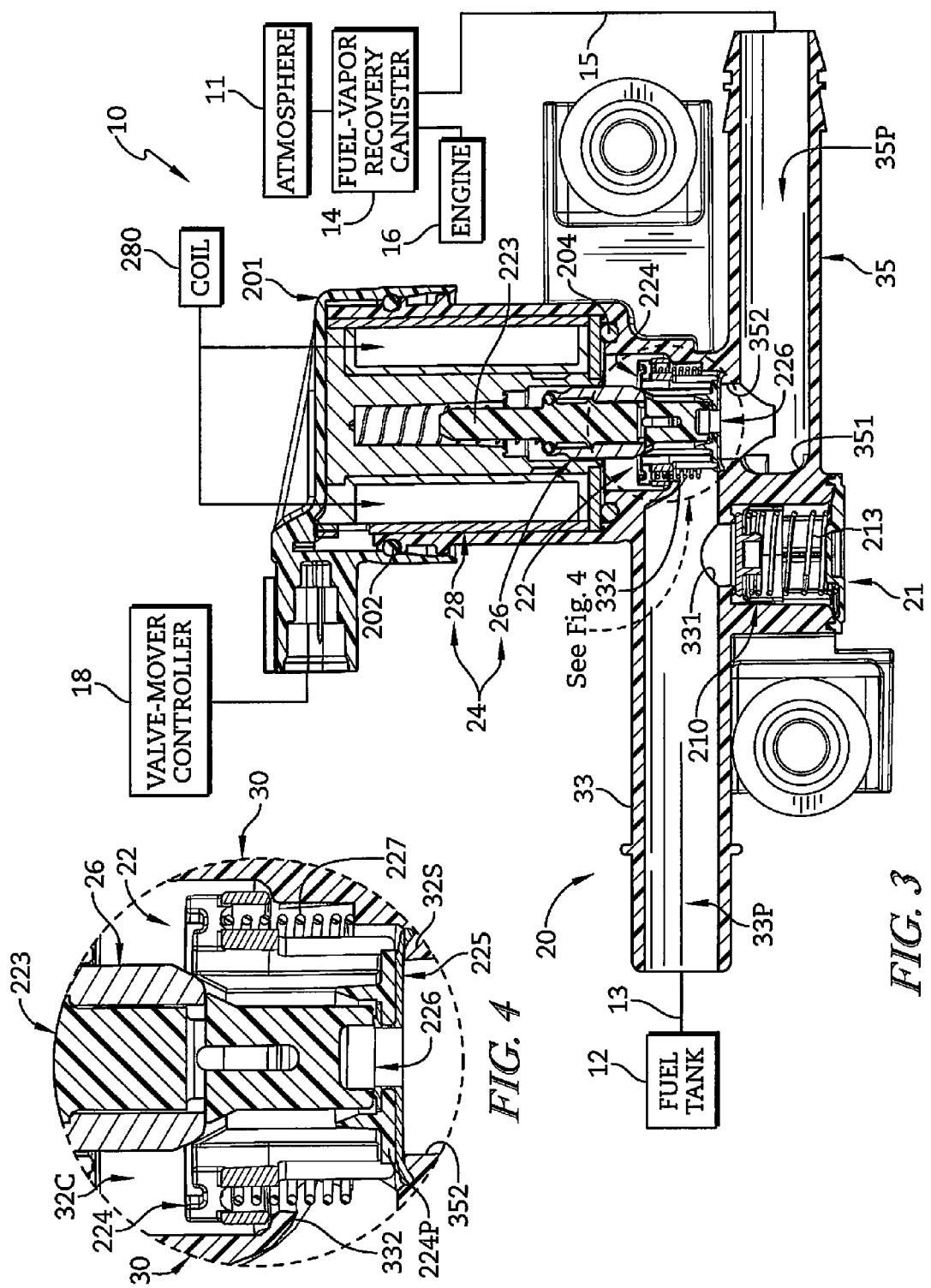
FIG. 3 is a side elevation view of the vent apparatus of FIG. 1 showing each of the multi-stage and single-stage valves in closed positions to block fluid flow between the tank and canister passageways.
FIG. 4 is an enlarged view taken from the circled region of FIG. 3.

Single-stage valve 21 regulates fluid flow in base 30 between the tank and canister conduits 13, 15 through the first holding compartment 30H1 formed in single-stage valve housing 31 as suggested in FIGS. 3, 5, and 7. Single-stage valve 21 can be moved relative to the base 30 by high-pressure fuel vapor extant in tank passageway 33P of tank pipe 33 from a closed position shown in FIGS. 1 and 3 to a pressure-activated opened position shown in FIG. 10 to vent pressurized fuel vapor from fuel tank 12 through a fluid-flow chamber 31C defined by holding compartment 30H1 along a single-stage vapor flow path to fuel vapor recovery canister 14.

Holding compartment 30H1 formed in single-stage valve housing 31 is sized and shaped to contain the single-stage valve 21 as suggested in FIG. 1. This compartment 30H1 provides a first fluid-flow chamber 31C through which fluid (e.g. fuel vapor or air) can flow as it travels between fuel tank 12 and fuel vapor recovery canister 14, for example, to vent high pressure fuel vapor from fuel tank 12 to fuel vapor recover canister 14 when single-stage valve 21 is opened as suggested in FIGS. 10-12. Holding compartment 30H2 formed in multi-stage valve housing 32 is sized and shaped to contain valve mover 24 (e.g., armature 26 and solenoid 28) and multi-stage valve 22 as suggested in FIG. 1. Holding compartment 30H2 provides an upper solenoid-storage chamber containing solenoid 28 and upper portions of armature 26 and multi-stage valve 22 as also suggested in FIG. 1. Holding compartment 30H2 also provides second fluid-flow chamber 32C below upper solenoid-storage chamber 132C to link tank passageway 33P of tank pipe 33 in fluid communication with canister passageway 35P of canister pipe 35 as suggested in FIG. 1. Fluid (e.g. fuel vapor) can flow through a second fluid-flow chamber 32C along the multi-stage vapor flow path as it travels between fuel tank 12 and fuel vapor recovery canister 14, for example, before initiation of a tank-refueling activity, or a tank-pressuring activity to alleviate unwanted tank vacuum conditions.

Base 30 includes a tank pipe 33 coupled to fuel tank 12 via tank conduit 13 and a canister pipe 35 coupled to fuel vapor recovery canister 14 via canister conduit 15 as suggested in FIG. 1. Tank pipe 33 has an inlet 330 opening into tank conduit 13, a first outlet 331 opening into a fluid-flow chamber 31C formed in the holding compartment 30H1 formed in single-stage valve housing 31, and a second outlet 332 opening into a second fluid-flow chamber 32C provided in the holding compartment 30H2 formed in multi-stage valve housing 32 as suggested in FIG. 1. Canister pipe 35 has a first inlet 351 opening into the first fluid-flow chamber 31C provided in compartment 30H1 formed in single-stage valve housing 31, a second inlet 352 opening into the second fluid-flow chamber 32C provided in lower compartment 30H2 formed in multi-stage valve housing 32, and an outlet 350 opening into canister conduit 15 as suggested in FIG. 1. When multi-stage valve 22 is opened as suggested in FIGS. 5, 7, and 9, fluid (e.g. fuel vapor and air) can flow between tank and canister pipes 33, 35 through second fluid-flow chamber 32C provided in multi-stage valve housing 32 along the multi-stage vapor flow path without flowing through the first fluid-flow chamber 31C provided in single-stage valve housing 31 along the single-stage vapor flow path. When single-stage valve 21 is opened as suggested in FIG. 10, fluid (e.g. pressurized fuel vapor) can flow between tank and canister pipes 33, 35 through first fluid-flow chamber 31C along the single-stage vapor flow path without flowing through second fluid-flow chamber 32C along the multi-stage vapor flow path.

Figure 2:
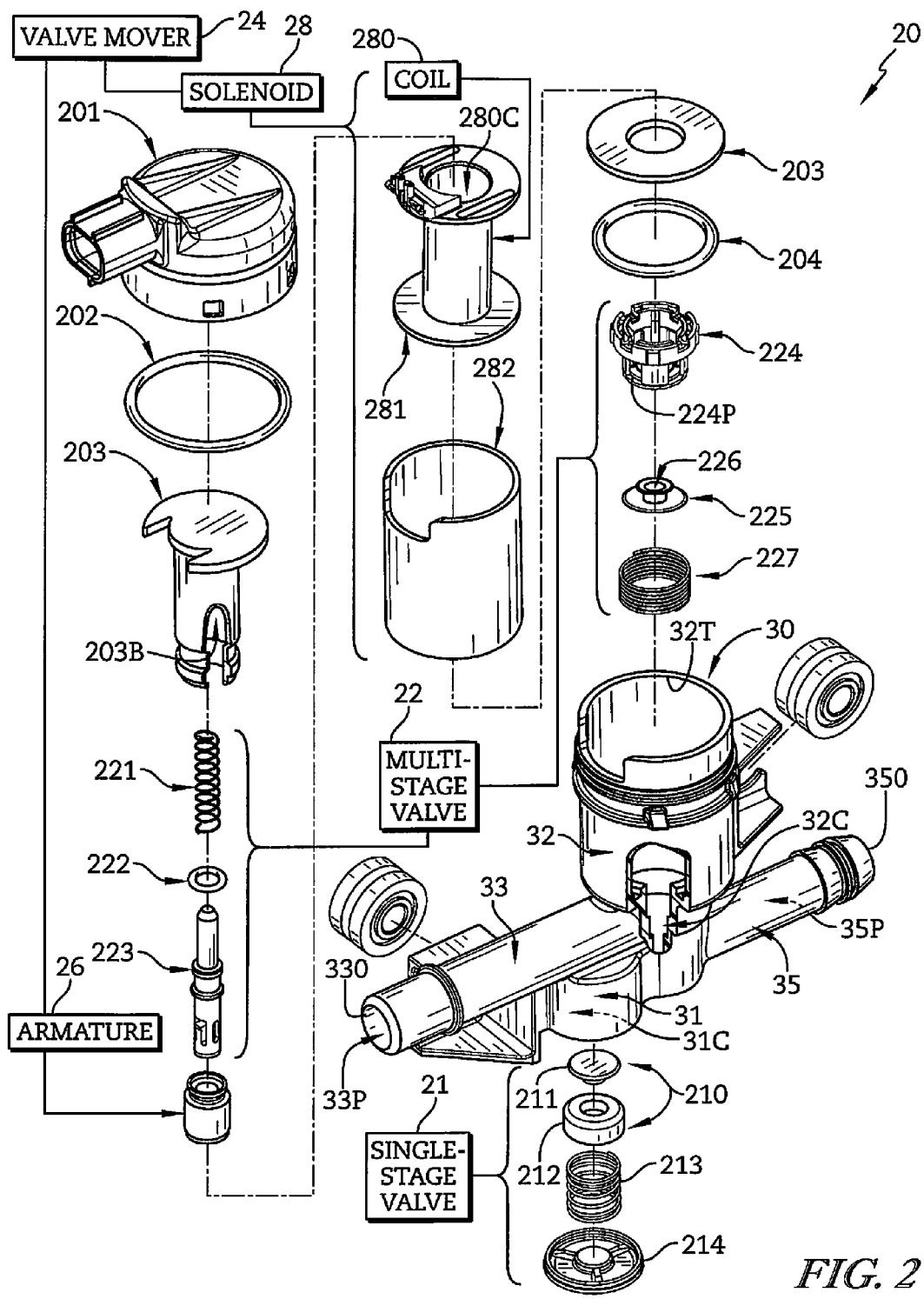
FIG. 2 is an exploded perspective assembly view of the components included in the vent apparatus of FIG. 1 and showing that the vent apparatus includes a monolithic base formed to include an upwardly extending multi-stage valve housing, a tank pipe extending to the left away from the multi-stage valve housing, a canister pipe extending to the right away from the multi-stage valve housing, and a downwardly extending single-stage valve housing located below the tank pipe and coupled to an underside of the tank pipe and an inner end of the canister pipe, and showing that several components cooperate to form a single-stage valve that can be mounted in the downwardly extending single-stage valve housing, a portion of the upwardly extending multi-stage valve housing being broken away to show a fluid-flow chamber formed in a lower region of the multi-stage valve housing, an upwardly facing annular valve seat formed in the base and arranged to surround a large-diameter vent aperture interconnecting the overlying fluid-flow chamber and the underlying canister passageway formed in the canister pipe, and also showing that the vent apparatus further includes, in series, left to right and top to bottom, a top lid sized to close a top opening formed in the multi-stage valve housing, a large-diameter O-ring lid seal, a valve-support core formed to include a downwardly opening bore sized to receive portions of the armature and the multi-stage valve therein, a coiled return spring, a small O-ring seal, a plunger, an armature, a coil, a spool-shaped bobbin for holding the coil, a large-diameter sleeve for surrounding the bobbin and the coil, a bobbin-support washer, an O-ring solenoid seal, a plunger-receiver cage, a diaphragm seal associated with the plunger-receiver cage and formed to include a small-diameter vent aperture, and a coiled cage-biasing spring associated with the upwardly facing annular valve seat formed in the base.

Vent apparatus 20 comprises a multi-stage valve 22, an electronic valve mover 24 associated with multi-stage valve 22, and a single-stage valve 21 as suggested in FIGS. 1 and 2. Multi-stage valve 22 is configured to regulate the flow of pressurized fuel vapor from the tank passageway 33P into the canister passageway 35P to relieve unwanted tank pressure conditions as suggested in FIGS. 5 and 7 and also to regulate the flow of outside air from the canister passageway 35P into the tank passageway 33P to relieve unwanted tank vacuum conditions automatically as suggested in FIG. 9. Valve mover 24 includes a movable armature 26 coupled to multi-stage valve 22 to move therewith and a solenoid 28 comprising a stationary coil 280 formed to include a central vertical channel 280C receiving portions of the movable armature 26 and multi-stage valve 22 therein as suggested in FIGS. 1 and 2. Coil 280 can be energized by remote control using a valve-mover controller 18 also included in tank venting system 10 for example, just before initiation of a tank-refueling activity for fuel tank 12 to move armature 26 relative to coil 280 and thus cause movement of multi-stage valve 22 relative to coil 280 to tank-venting FIRST opened position shown in FIG. 5. Single-stage valve 21 is arranged to regulate flow of pressurized fuel vapor from the tank passageway into the canister passageway as suggested in FIGS. 10 and 11 along a single-stage vapor flow path that is separate from the multi-stage vapor flow path regulated by multi-stage valve 22.

An exploded perspective assembly view of the components included in vent apparatus 20 is provided in FIG. 2. Vent apparatus 20 includes a monolithic base 30 formed to include an upwardly extending multi-stage valve housing 32, a tank pipe 33 extending to the left away from multi-stage valve housing 32, a canister pipe 35 extending to the right away from multi-stage valve housing 32, and a downwardly extending single-stage valve housing 31 located below tank pipe 33 and coupled to an underside of tank pipe 33 and an inner end of canister pipe 35.

Several components included in vent apparatus 20 cooperate to form a single-stage valve 21 that can be mounted in the downwardly extending single-stage valve housing 31 as suggested in FIGS. 1 and 2. Single-stage valve 21 comprises a relief valve gasket seal 211, a backing plate 212 that cooperates with gasket seal 211 to form a closure 210, a closure-biasing return spring 213, and a relief valve cover 214. Closure 210 is movable in fluid-flow chamber 31C against a closing force generated by return spring 213 between a closed position (see FIGS. 1 and 3) engaging an annular valve seat 31S included in body 30 and arranged to surround the first outlet 331 that couples tank passageway 33P and fluid-flow chamber 31C in fluid communication and an opened position (see FIG. 10) disengaging annular valve seat 31S in response to an opening force exerted on a topside of closure 210 by pressurized fuel vapor in excess of a predetermined level in tank passageway 33P of tank pipe 33.

Multi-stage valve 22 is separated fluidly from single-stage valve 21 as suggested in FIG. 1 because multi-stage valve 22 is associated with a second outlet 332 of tank pipe 33 while single-stage valve 21 is associated with a separate first outlet 331 of tank 33. A portion of the upwardly extending multi-stage valve housing 22 is broken away in FIG. 2 to show a fluid-flow chamber 32C formed in a lower region of the multi-stage valve housing 32 and an upwardly facing annular valve seat 32S formed in base 30 and arranged to surround a large-diameter vent aperture defined by second inlet 352 of canister pipe 35 and arranged to interconnect the overlying fluid-flow chamber 32C and the underlying canister passageway 35P formed in canister pipe 35.

Vent apparatus 20 further includes as suggested in FIG. 2, in series, left to right and top to bottom, a top lid 201 sized to close a top opening 32T formed in multi-stage valve housing 32, a large-diameter O-ring lid seal 202, a valve-support core 203 formed to include a downwardly opening bore 203B sized to receive portions of armature 26 and multi-stage valve 22 therein, a coiled return spring 221, a small O-ring seal 222, a plunger 223, an armature 26, a coil 280, a spool-shaped bobbin 281 for holding coil 280, a large-diameter sleeve 282 for surrounding the bobbin 281 and the coil 280, a bobbin-support washer 283, an O-ring solenoid seal 204, a plunger-receiver cage 224, a diaphragm seal 225 associated with the plunger-receiver cage 224 and formed to include a small-diameter vent aperture 226, and a coiled cage-biasing spring 227 associated with the upwardly facing annular valve seat 32S formed in base 30.

Each of the multi-stage and single-stage valves 22, 21 is shown in FIG. 3 in closed positions to block fluid flow between the tank and canister passageways 33P, 35P. These valves 22, 21 can be opened at various times and under various tank-pressure conditions as described and shown herein to allow fluid flow between the tank and canister passageways 33P, 35P.

A solenoid-activated first-stage venting of pressurized fuel vapor from the tank passageway 33P into the canister passageway 35P takes place in accordance with the present disclosure following movement of multi-stage valve 22 to a FIRST opened position in response to activation of valve-mover controller 18 included in tank venting system 10 to energize a coil 280 included in solenoid 28 to produce a magnetic field in armature 26 that is coupled to plunger 223 in the multi-stage valve 22 to draw armature 26 further into a vertical central channel 280C formed in the solenoid 28 to move plunger 223 of multi-stage valve 22 upwardly from a closed position closing a small-diameter vent aperture 226 formed in the diaphragm seal 225 mounted on the underside of the plunger-receiver cage 224 included in the multi-stage valve 22 to an opened position opening the underlying small-diameter vent aperture 226 to allow pressurized fuel vapor to flow from the tank passageway 33P through the small-diameter vent aperture 226 into the canister passageway 35P toward the downstream fuel-vapor recovery canister 14 while the diaphragm seal 225 carried on the plunger-receiver cage 226 remains mated with the underlying upwardly facing annular valve seat 32S formed in the base 30.

A subsequent second-stage venting of pressurized fuel vapor from the tank passageway 33P into the canister passageway 35P takes place in accordance with the present disclosure following movement of multi-stage valve 22 to a THIRD opened position after the pressure of that pressurized fuel vapor extant in the tank passageway 33P has lowered from a first pressure (P1) suggested in FIG. 5 to a lower second pressure (P2) suggested in FIG. 7 to allow the coiled cage-biasing spring 227 associated with the plunger-receiver cage 224 to act against the base 30 and urge the plunger-receiver cage 224 upwardly away from an underlying annular valve seat 35S formed in the base 30 of the vent apparatus 20 to open the large-diameter vent aperture 352 bounded by the upwardly facing annular valve seat 32S formed in the base 30 to allow pressurized fuel vapor to flow from the tank passageway 33P through the large-diameter vent aperture 352 into the canister passageway 35P toward the downstream fuel-vapor recovery canister 14.

Multi-stage valve 22 is moved to a SECOND opened position in accordance with the present disclosure when an unwanted vacuum is created in fuel tank 12. Vacuum (e.g., negative pressure) conditions developed in the fuel tank 12 as suggested in FIG. 9 cause a sufficient lifting force (F) to be applied to a topside of a diaphragm-mount plate 224P included in a lower portion of plunger-receiver cage 224 of multi-stage valve 22 to raise plunger-receiver cage 224 upwardly (with assistance from the coiled cage-biasing spring 227) to cause the underlying diaphragm seal 225 to move upwardly away from the underlying annular valve seat 32S formed in the base 30 to open the large-diameter vent aperture 352 defined by the annular valve seat 32S formed in the base 30 so that outside air at atmospheric pressure passing through the fuel-vapor recovery canister 14 can flow from the canister passageway 35P through the opened large-diameter vent aperture 352 into the tank passageway 33P to relieve unwanted vacuum conditions in the fuel tank 12.

Figure 10:
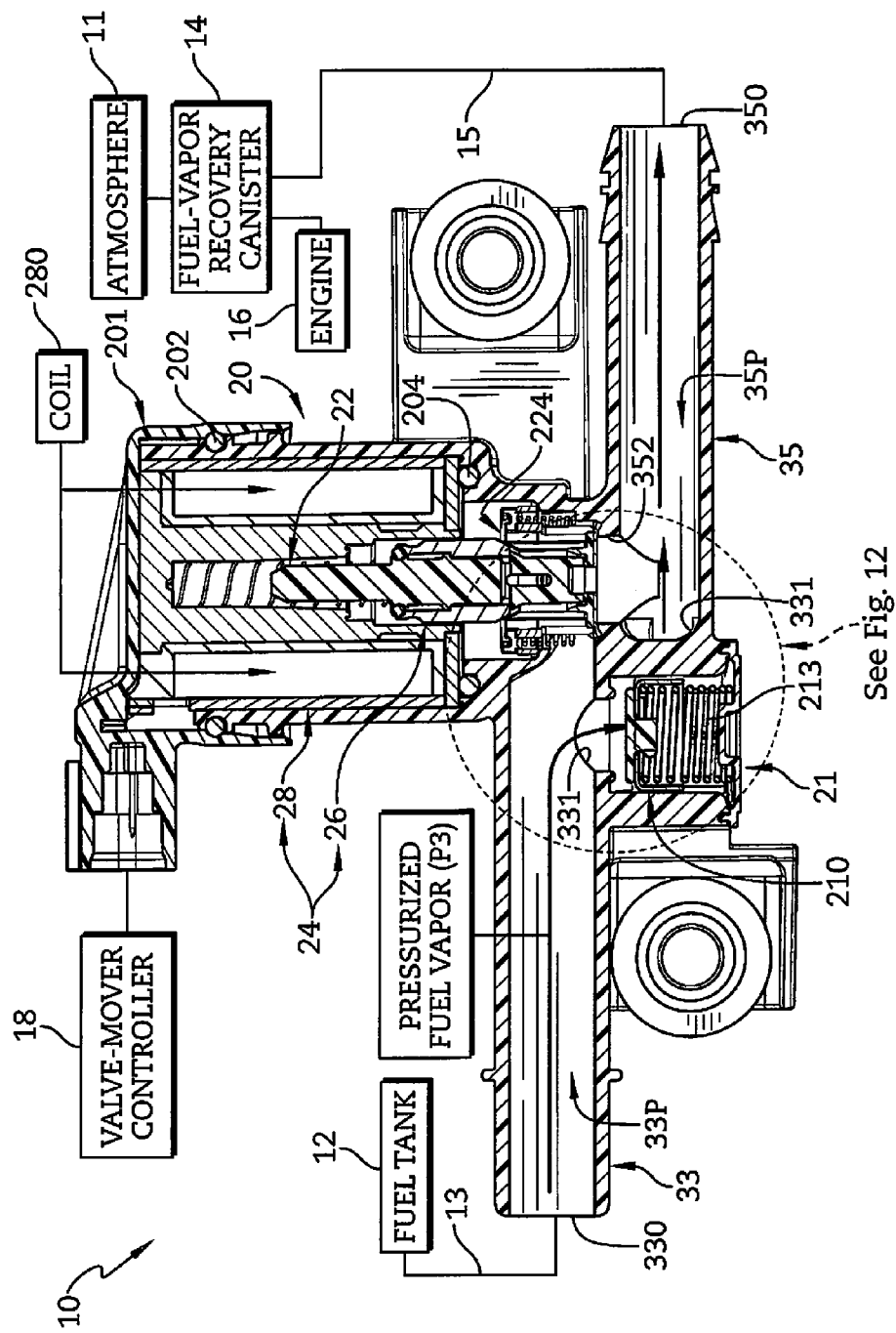
FIG. 10 is a view similar to FIGS. 3, 5, 7, and 9 showing the multi-stage valve in a closed position to block flow of fuel vapor through the multi-stage vapor flow path and showing that pressurized fuel vapor extant in the tank passageway acts to exert a downward force sufficient to open the single-stage valve located in the single-stage valve housing to allow flow of pressurized fuel vapor from the tank passageway through the single-stage valve housing along the single-stage vapor flow path into the canister passageway without flowing through the fluid-flow chamber and the separate multi-stage vapor flow path formed in the multi-stage valve housing and either of the small-diameter and large-diameter vent apertures associated with the multi-stage valve.

Multi-stage valve 22 is shown in a closed position in FIG. 10. Pressurized fuel vapor extant in the tank passageway 33P acts to exert a downward force sufficient to open the single-stage valve 21 located in the single-stage valve housing 31 to allow flow of pressurized fuel vapor from the tank passageway 33P through the single-stage valve housing 31 into the canister passageway 35P without flowing through the fluid-flow chamber 32C formed in the multi-stage valve housing 22 and either of the small-diameter and large-diameter vent apertures 226, 352 associated with the multi-stage valve 22.

Tank venting system 10 comprises a base 30, a single-stage valve 21, and a multi-stage valve 22 as suggested in FIGS. 1 and 2. Base 30 is formed to include a tank passageway 33P adapted to be coupled in fluid communication to a fuel tank 12, a canister passageway 35P adapted to be coupled in fluid communication to a fuel vapor recovery canister 14, a first fluid-flow chamber 31C arranged to interconnect the tank and canister passageways 33P, 35P in fluid communication, and a separate second fluid-flow chamber 32C arranged to interconnect the tank and canister passageways 33P, 35P in fluid communication as suggested in FIG. 1. The single-stage valve 21 is arranged to regulate flow of fuel vapor between the tank and canister passageways 33P, 35P through the first fluid-flow chamber 31C. The multi-stage valve 22 is arranged to regulate flow of fuel vapor between the tank and canister passageways 33P, 35P through the second fluid-flow chamber 32C. Movement of multi-stage valve 22 relative to body 30 is independent of movement of single-stage valve 21 relative to body 30.

Tank venting system 10 further comprises an electronic valve mover 24 coupled to multi-stage valve 22 and configured to move multi-stage valve 22 from a closed position shown in FIG. 3 to a FIRST opened position shown in FIG. 5 by remote control to allow pressurized fuel vapor to flow from fuel tank 12 through second fluid-flow chamber 32C to fuel vapor recovery canister 14. Multi-stage valve 22 is moved from the FIRST opened position to a SECOND opened position different than the FIRST opened position to allow pressurized fuel vapor to flow from fuel tank 12 through second fluid-flow chamber 32C to fuel vapor recovery canister 14 as suggested in FIG. 7. Multi-stage valve 22 is configured to move from a closed position to a THIRD opened position different from the FIRST opened position to admit fuel vapor that has exited the fuel vapor recovery canister 14 and passed through second fluid-flow chamber 32C into fuel tank 12 to dissipate a vacuum that has developed in fuel tank 12 as suggested in FIG. 9.

Body 30 further includes a tank pipe 33 formed to include the tank passageway 33P as suggested in FIG. 1. Tank pipe 33 includes an inner end, an outer end, and a side wall arranged to extend between the inner and outer ends and formed to include a first outlet 331 opening into the first fluid-flow chamber 32C. The inner end of tank pipe 33 is formed to include a second outlet 332 opening into the second fluid-flow chamber 32C. The outer end of tank pipe 33 is formed to include an inlet 330 communicating with fuel tank 14.

Body 30 also includes a canister pipe 35 formed to include the canister passageway 35P as suggested in FIG. 1. Canister pipe 35 includes an inner end, an outer end, and a side wall arranged to extend between the inner and outer ends and formed to include a second inlet 352 opening into the second fluid-flow chamber 32C. The inner end of the canister pipe 35 is formed to include a first inlet 351 opening into the first fluid-flow chamber 31C. The outer end of canister pipe 35 is formed to include an outlet 350 communicating with fuel vapor recovery canister 14.

One purpose of vent apparatus 20 is to contain evaporative emissions within fuel tank 12 by isolating fuel tank 12 from canister 14 under most conditions and closing tank venting system 10. During vehicle driving conditions, vent apparatus 20 will be signaled to open so that tank venting system 10 can draw fuel from fuel tank 12 as needed for running vehicle engine 16 and thus draw the fuel vapors that are in the fuel vapor recovery canister 14 back to the fuel tank 12. The fuel vapor recovery canister 14 then draws in filtered fresh air from the atmosphere 11.

In a hybrid vehicle having an engine that is not running or in a vehicle having a canister that have very low purging, then vent apparatus 20 will remain closed to keep the tank venting system 10 closed. This will again keep the fuel vapors contained in the fuel tank 12 and will allow more efficient purging of fuel vapor recovery canister vapors without drawing fuel vapors from the fuel tank 12.

When the vehicle operator prepares to fill the fuel tank 12, there is a button (i.e., valve-mover controller 18) that they must first push to activate the vent apparatus 20 to open, relieving any vacuum or pressure that may have built up in the fuel tank 12. That tank vacuum or pressure is always directed through the vent apparatus 20 and the fuel vapor recovery canister 14. Under any circumstance when the pressure or vacuum in the fuel tank 12 exceeds the required application limits, a signal tells the vent apparatus 20 to activate and open to relieve that pressure or vacuum via the fuel vapor recovery canister 14. The mechanical relief valves are available in the event the coil or main shutoff valve fail for any reason, or do not respond as expected to those pressure or vacuum excesses.

The coil 280 is designed to be enclosed in a housing that has a cap 201 that contains terminals with a treacherous path to reduce moisture ingress. Other designs have terminations that are short and straight into the coil winding area and are thought to provide a leak path for moisture ingress. The cap 201 is sealed by an O-ring 202 and can be removed for inspection and serviceability of the coil assembly without sacrificing the complete valve.

The single-stage valve 21 is located on the tank port side as suggested in FIG. 1 to make the opening a direct process with a reduction of components as compared to other designs. A wall portion 215 is provided in the pressure relief cavity 31C that allows for a smoothing effect on the air flow so that the pressure-relief seal 211 pushes away from the seat 31S in a straight fashion without tilting in the cavity 31C. That wall portion 215 is shown, for example, in FIG. 11.

By lengthening the core and shortening the armature 26 the method of snap-on attachment of the armature 26 to the plunger 223 is also simpler than other designs. The small O-ring 222 that is placed on the plunger/armature assembly 223, 26 is for noise reduction when the armature 26 closes to the core. The method is simpler than other designs.

The invention claimed is:

1. A tank venting system comprising
a base formed to include a tank passageway adapted to be coupled in fluid communication to a fuel tank, a canister passageway adapted to be coupled in fluid communication to a fuel vapor recovery canister, a first fluid-flow chamber arranged to interconnect the tank and canister passageways in fluid communication, and a separate second fluid-flow chamber arranged to interconnect the tank and canister passageways in fluid communication,
a single-stage valve arranged to regulate flow of fuel vapor between the tank and canister passageways through the first fluid-flow chamber, and
a multi-stage valve arranged to regulate flow of fuel vapor between the tank and canister passageways through the second fluid-flow chamber,
wherein the multi-stage valve comprises a coiled return spring, a small O-ring seal, a plunger, a plunger-receiver cage, a diaphragm seal associated with the plunger-receiver cage and formed to include a small-diameter vent aperture, and a coiled cage-biasing spring associated with an upwardly facing annular valve seat formed in the base.

2. The tank venting system of claim 1, wherein movement of the multi-stage valve relative to the base is independent of movement of the single-stage valve relative to the base.

3. The tank venting system of claim 1, further comprising an electronic valve mover coupled to the multi-stage valve and configured to move the multi-stage valve from a closed position to a first opened position by remote control to allow pressurized fuel vapor to flow from the fuel tank through the second fluid-flow chamber to the fuel vapor recovery canister.

4. The tank venting system of claim 3 wherein the multi-stage valve is moved from the first opened position to a second opened position different than the first opened position to allow pressurized fuel vapor to flow from the fuel tank through the second fluid flow chamber to the fuel vapor recovery canister.

5. The tank venting system of claim 4, wherein the multi-stage valve is configured to move from a closed position to a third opened position different from the first position to admit fuel vapor that has exited the fuel vapor recover canister and passed through the second fluid-flow chamber into the fuel tank to dissipate a vacuum that has developed in the fuel tank.

6. The tank venting system of claim 1, wherein the base includes a tank pipe formed to include the tank passageway, the tank pipe includes an inner end, and outer end, and a side wall arranged to extend between the inner and outer ends and formed to include a first outlet opening into the first fluid-flow chamber, and the inner end of the tank pipe is formed to include a second outlet opening into the second fluid-flow chamber and an outer end of the tank pipe is formed to include an inlet communicating with the fuel tank.

7. The tank venting system of claim 6, wherein the base includes a canister pipe formed to include the canister passageway, the canister pipe includes an inner end, and outer end, and a side wall arranged to extend between the inner and outer ends and formed to include a second inlet opening into the second fluid-flow chamber, the inner end of the canister pipe is formed to include a first end opening into the first fluid-flow chamber, and the outer end of the canister pipe is formed to include an outlet communicating with the fuel vapor recovery canister.

8. The tank venting system of claim 1, wherein the body base includes a canister pipe formed to include the canister passageway, the canister pipe includes an inner end, and outer end, and a side wall arranged to extend between the inner and outer ends and formed to include a second inlet opening into the second fluid-flow chamber, the inner end of the canister pipe is formed to include a first end opening into the first fluid-flow chamber, and the outer end of the canister pipe is formed to include an outlet communicating with the fuel vapor recovery canister.

9. The tank venting system of claim 1, wherein the canister passageway has a first vent aperture from the first fluid-flow chamber and the canister passageway has a second vent aperture from the second fluid-flow chamber.

10. The tank venting system of claim 1, wherein the second fluid-flow chamber is adapted for receiving fuel vapor flow directly from the canister passageway and enabling flow directly into the tank passageway while bypassing the first fluid-flow chamber.

11. The tank venting system of claim 1, wherein
the single-stage valve is adapted to enable flow of fuel vapor from the tank passageway into the canister passageway without the fuel vapor flowing into the second fluid-flow chamber.

* * * * *